United States Patent
Simonpietri et al.

(10) Patent No.: US 9,823,417 B2
(45) Date of Patent: Nov. 21, 2017

(54) WAVEGUIDE POLARIZING OPTICAL DEVICE

(71) Applicant: IXBLUE, Saint-Germain-en-Laye (FR)

(72) Inventors: Pascal Simonpietri, Cormeilles en Parisis (FR); Stephane Chouvin, Bagneux (FR); Cedric Molucon, Saint Germain en Laye (FR)

(73) Assignee: IXBLUE, Saint-Germain (FR)

( * ) Notice: Subject to any disclaimer, the term of this patent is extended or adjusted under 35 U.S.C. 154(b) by 0 days.

(21) Appl. No.: 15/324,781

(22) PCT Filed: Jul. 6, 2015

(86) PCT No.: PCT/FR2015/051866
§ 371 (c)(1),
(2) Date: Jan. 9, 2017

(87) PCT Pub. No.: WO2016/005692
PCT Pub. Date: Jan. 14, 2016

(65) Prior Publication Data
US 2017/0212305 A1    Jul. 27, 2017

(30) Foreign Application Priority Data
Jul. 8, 2014 (FR) .................... 14 56552

(51) Int. Cl.
*G02B 6/27* (2006.01)
*G02B 6/126* (2006.01)
(Continued)

(52) U.S. Cl.
CPC ......... *G02B 6/2706* (2013.01); *G02B 5/3033* (2013.01); *G02B 6/024* (2013.01);
(Continued)

(58) Field of Classification Search
CPC .. G02B 6/2706; G02B 6/2766; G02B 6/2726; G02B 6/30; G02B 5/3033; G02B 6/024; G02B 6/126
See application file for complete search history.

(56) References Cited

U.S. PATENT DOCUMENTS 7,567,736 B2 *   7/2009   Ishikawa ............ G02B 6/12011
                                                    385/1
7,711,216 B2 *   5/2010   Lewis .................... G02B 6/126
                                                    385/11
(Continued)

FOREIGN PATENT DOCUMENTS

WO         01/75195 A2    10/2001

OTHER PUBLICATIONS

International Search Report, dated Sep. 22, 2015, from corresponding PCT application.

*Primary Examiner* — Akm Enayet Ullah
(74) *Attorney, Agent, or Firm* — Young & Thompson

(57) ABSTRACT

Disclosed is a waveguide polarizing optical device, including a first waveguide polarizer (6), a section of a second optical waveguide (31) and a second thin-plate polarizer (52) having a physical thickness T and a refractive index n, the second thin-plate polarizer (52) being disposed on the optical path between a waveguide end (8) of the first polarizer (6) and one end (32) of the second optical waveguide (31), the physical distance d between the waveguide end (8) of the first polarizer (6) and the end (32) of the second optical waveguide (31) being less than or equal to twice the Rayleigh length and the physical thickness T of the second polarizer (52) being less than or equal to the physical distance d.

20 Claims, 2 Drawing Sheets

(51) Int. Cl.
*G02B 5/30* (2006.01)
*G02B 6/024* (2006.01)
*G02B 6/30* (2006.01)

(52) U.S. Cl.
CPC .......... *G02B 6/126* (2013.01); *G02B 6/2726* (2013.01); *G02B 6/2766* (2013.01); *G02B 6/30* (2013.01)

(56) References Cited

U.S. PATENT DOCUMENTS

| | | | |
|---|---|---|---|
| 2009/0087133 A1 | 4/2009 | Lewis | |
| 2010/0284644 A1* | 11/2010 | Sugamata | G02F 1/225 385/2 |
| 2012/0121216 A1* | 5/2012 | Oh | G01R 15/246 385/1 |
| 2017/0211952 A1* | 7/2017 | Simonpietri | G01D 5/35322 |

* cited by examiner

WAVEGUIDE POLARIZING OPTICAL DEVICE

TECHNICAL FIELD TO WHICH THE INVENTION RELATES

The present invention relates to a polarizing optical device.

More precisely, the invention relates to a waveguide polarizing optical device comprising an integrated optical circuit (IOC).

TECHNOLOGICAL BACKGROUND

Many integrated optical circuits exist, consisted of a planar substrate and an optical waveguide deposited on the planar substrate. The IOCs are generally manufactured by techniques of microlithography and/or thermal diffusion. The integrated optical circuits may be manufactured from substrates of different materials such as semiconductors, glass or lithium niobate ($LiNbO_3$) or lithium tantalate ($LiTaO_3$). There exist different optical components on integrated optical circuit: polarizer, phase modulator, Mach-Zehnder interferometer, Y-junction, 2×2 coupler or 3×3 coupler. Especially, the integrated optical circuits formed by proton exchange on lithium niobate find many applications, for example in rotation measurement systems.

By comparison with the optical devices in free space, optical devices on integrated optical circuit offer the advantage to allow the integration of several functions on a same IOC, which allows improving the compactness and reducing the optical connections.

However, the specifications of the optical devices on integrated optical circuit have certain limitations. Hence, a waveguide polarizer on integrated optical circuit has a polarization extinction ratio that is limited to about −45 to −65 dB.

Figure 1:
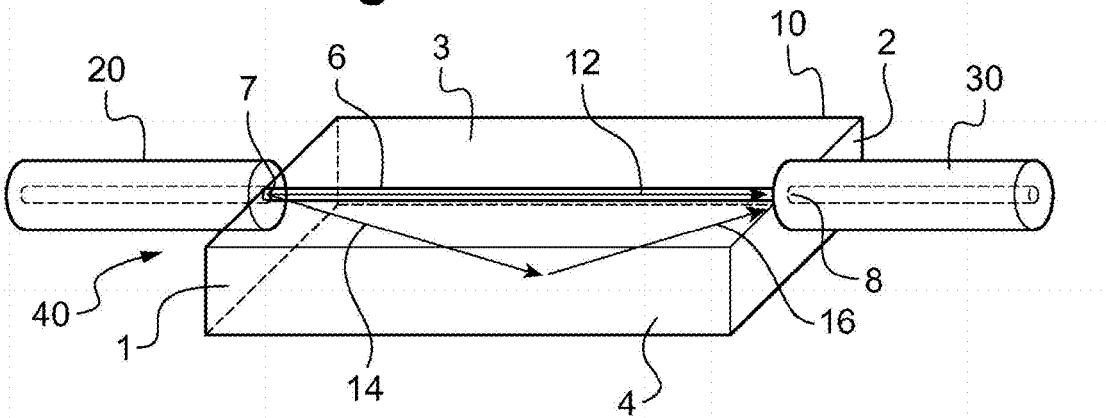

FIG. 1 schematically shows a perspective view of a waveguide polarizing device according to the prior art and illustrates the operation of this device.

The polarizing device 40 comprises an integrated optical circuit comprising a planar substrate 10 and a polarizing waveguide 6. By convention in the present disclosure, the substrate 10 comprises an input face 1, an output face 2, a lower face 4, an upper face 3 and two lateral faces. The lower face 4 and the upper face 3 extend between the input face 1 and the output face 2. The lower face 4 and the upper face 3 are opposed to each other. Preferably, the lower face 4 and the upper face 3 are planar and parallel to each other. Likewise, the lateral faces are planar and parallel to each other and extend between the input face 1 and the output face 2. The optical waveguide 6, for example rectilinear, extends between a first end 7 on the input face 1 and a second end 8 on the output face 2. The input 1 and output 2 faces of the substrate may also be planar and polished, but are preferably cut with an inclination angle with respect to the axis of the waveguide at the ends 7 and 8 to avoid the spurious back-reflections. By convention, the waveguide 6 is closer to the upper face 3 than to the lower face 4. Such a waveguide polarizer 6 on an integrated optical circuit may be easily connected by sections of optical fiber 20, 30 to other optical components such as a light source or a detector.

In the case of a lithium niobate proton-exchange polarizer, the optical waveguide 6 is located under the upper face 3 of the substrate and extends in a plane parallel to the upper face 3. The optical waveguide 6 forms a waveguide polarizer that guides only one polarization. The optical waveguide 6 may be delimited by the upper face or be buried just under this upper face. In other types of IOC, the waveguide 6 may be deposited on the upper surface 3 or may extend inside the substrate, for example in a plane parallel to the upper surface 3, at half the distance between the lower face 4 and the upper face 3. An input optical fiber 20 and an output optical fiber 30 are optically coupled to the first end 7 and to the second end 8, respectively, of the waveguide 6.

The input optical fiber 20 transmits an optical beam in the integrated optical circuit. A part of the optical beam is guided by the waveguide. The guided beam 12 propagates up to the end 8 of the waveguide 6 opposite the output fiber 30. Due to a mode mismatch between the core of the optical fiber 20 and the integrated waveguide 6, another part of the beam is not coupled in the waveguide and propagates freely in the substrate 10. A non-guided beam 14 then propagates in the substrate up to the lower face 4 of the substrate. A part of the non-guided beam 14 may be reflected by total internal reflection on the lower face 4. A part of the reflected beam 16 may then be transmitted up to the end of the substrate opposite the output fiber 30. The output fiber 30 may hence collect not only the guided optical beam 12, but also a part of the non-guided and reflected optical beam 16. An input beam is generally coupled to an end of an optical waveguide through an optical fiber. However, only certain modes, for example of polarization, are guided by the waveguide, the other modes propagating freely in the substrate. Moreover, it the core of the fiber is not perfectly aligned with the waveguide of the integrated optical circuit, a part of the incident light beam may be coupled in the substrate and may propagate outside the waveguide. A part of the light non-guided by the waveguide may be reflected by total internal reflection on one or several faces of the substrate. Finally, a part of this non-guided light may be coupled to an output optical fiber opposite another end of the waveguide. The non-guided light may hence disturb the operation of an integrated optical circuit. For example, in the case of a lithium niobate proton-exchange polarizer, the polarization rejection ratio may be affected by the coupling of the light transmitted by the substrate in a non-guided manner.

FIG. 1 shows only a single reflection on the lower face 4 of the substrate, at half the distance between the input face 1 and the output face 2, i.e. at the centre of the lower face 4. However, other multiple internal reflections are also possible. Indeed, the substrate may transmit different non-guided beams propagating by internal reflection, in particular on the lower face 4, but also by multiple reflections between the lower face 4 and the upper face 3, or on the lateral faces 5. Spurious non-guided beams propagating by internal reflection on the faces of the substrate may arrive near the waveguide end 8 of the output face 2 of the substrate.

Generally, the non-guided beams reflected inside the substrate may affect the quality of the signals transmitted in the waveguide of an integrated optical circuit. In the case of a lithium niobate proton-exchange polarizer, cut along an X plane and comprising an integrated waveguide along the Y axis of propagation, the guided beam 12 is generally a beam of TE polarization and the non-guided beam 14 is a beam of TM polarization. Due to the internal reflections of non-guided light in the substrate, the polarization rejection ratio of a proton-exchange polarizer according to the scheme of FIG. 1 is in practice limited to about −50 dB.

Now, the quality of a polarizer influences the performances of certain applications. It is hence necessary to improve the rejection ratio of an integrated waveguide polarizer.

Different solutions have been proposed to solve the problem of spurious coupling of non-guided optical beam between a waveguide input and a waveguide output in an integrated optical circuit.

It is generally admitted that the main contribution to the spurious light comes from the primary reflection of a non-guided beam 14 at a primary reflection point located at the centre of the lower face 4 between a first waveguide end 7 on the input face 1 and a second waveguide end 8 on the output face 2.

In order to suppress the primary reflection on the lower face of a substrate 4, it has been proposed to machine a central groove arranged in the middle of the lower face 4 and extending transversally to the optical waveguide 6. A central groove on the lower face of the substrate allows absorbing or deviating the beams propagating in the substrate and hence improving the rejection ratio of a proton-exchange polarizer by several orders of magnitude. However, in practice, the rejection ratio of a proton-exchange polarizer remains limited to about −65 dB.

The invention aims to propose an alternative or complementary solution to the formation of a central absorbing groove on the lower face of a polarizing waveguide integrated optical circuit to increase the rejection ratio of a waveguide polarizing device.

Figure 2:
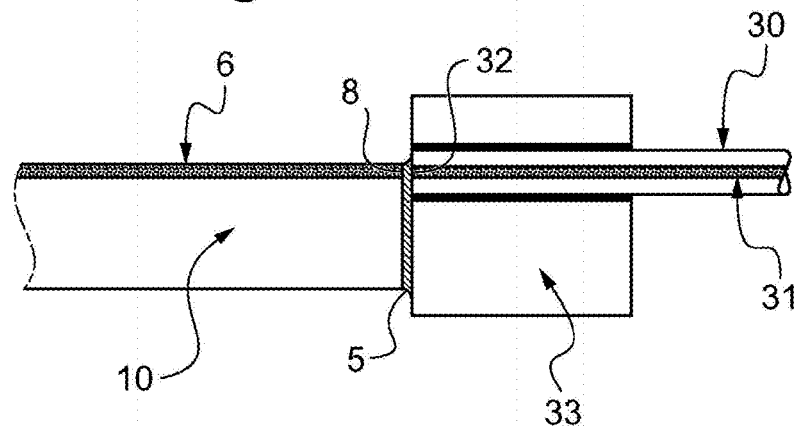

FIG. 2 schematically shows a sectional view of a detail of the polarizing device 40 of FIG. 1. The end of the optical fiber 30 is connected to a waveguide polarizer 5 formed on an integrated optical circuit substrate 10. The optical fiber 30 has a preferably single-mode core 31. The end of the optical fiber 30 is generally bonded to a ferrule 32, which allows connecting and aligning the end of the optical fiber 30 to the waveguide 6. The core 31 of the optical fiber is aligned and centred with respect to the waveguide 6 formed, for example, by proton exchange on a lithium niobate substrate 10. The optical fiber 30, via a ferrule, is made integral with the integrated optical circuit by means of glue 5 that is transparent at the wavelength used.

The mounting of FIG. 2 advantageously allows combining a polarization filter by means of the waveguide polarizer 6 and a spatial single-mode filter by means of the fiber 30.

The waveguide polarizer 6 formed by proton exchange allows separating, on the one hand, a polarization state, for example TM, guided in the waveguide 6, and on the other hand, a polarization state, for example TM, non-guided, that propagates in the substrate 10. The waveguide polarizers integrated on a lithium niobate substrate have a very high polarization rejection ratio for the non-guided polarization and a very limited insertion loss for the guided polarization.

However, as detailed in connection with FIG. 1, the waveguide polarizer 6 operates by an effect of selective guiding in polarization and not by absorption. That way, a part of the non-guided beam that propagates in the substrate 10 may be recoupled in the optical fiber at the output of the IOC after one or several internal reflections in the substrate.

In practice, in a proton-exchange polarizer 6 as illustrated in FIG. 2, the internal reflections of non-guided light in the substrate limit the polarization rejection ratio to a power of about −45 dB. Integrated circuits including a groove in the rear face of the substrate allow attenuating the spurious internal reflections and obtaining a polarization rejection ratio of at best −65 dB.

It results therefrom that a residual component of TM polarization that propagates via the substrate 10 of a proton-exchange polarizer 6 can be transmitted via the optical fiber 30 to an optical measurement system, for example for rotation measurement. Now, a so-called single-mode optical fiber 30 supports in reality two polarization modes.

The quality of the polarizer influences the performances of certain applications.

Searching to avoid the propagation of the TM polarization beam in the substrate of a waveguide polarizer, it has been proposed to place another polarizer (such as, for example, a polarization splitter cube, a crystal plate) for example upstream of the input fiber 20 and to connect this other polarizer to the integrated optical circuit via a polarization-maintaining fiber.

Another solution consists in using a polarizing fiber on the input fiber path 20. However, a polarizing fiber has for drawback to be very sensitive to the curvatures: the losses and the polarization extinction ratio (PER) are modified as a function of the radius of curvature and of the axis of such a curvature.

OBJECT OF THE INVENTION

The present invention has for object to remedy the drawbacks of the polarizing devices of the prior art and more particularly relates to a waveguide polarizing optical device.

According to the invention, the polarizing optical device comprises a first polarizer, the first polarizer being a waveguide polarizer on an integrated optical circuit, a section of a second optical waveguide, and a second polarizer, the second polarizer being a thin-plate polarizer having a physical thickness T and a refractive index n, the second thin-plate polarizer being interposed on the optical path between, on the one hand, a waveguide end of the first polarizer, and on the other hand, an end of the second optical waveguide, the physical distance d between said waveguide end of the first polarizer and said end of the second optical waveguide being lower than or equal to twice the Rayleigh length, i.e.:

$$d \le 2 \times \frac{\pi w_0^2}{\lambda_m}$$

where $$\lambda_m = \frac{\lambda_0}{n}$$

represents the wavelength of a beam in the second polarizer and $2w_0$ represents the diameter of a single-mode beam at 1/e in amplitude in the waveguide of the first polarizer and the physical thickness T of the second polarizer being lower than or equal to the physical distance d.

This combination of two particular polarizers in series allows increasing the polarization rejection ratio by comparison with a polarizing device of the prior art including only one waveguide polarizer on an integrated optical circuit, without generating spurious interference effects. Moreover, this combination induces extremely limited insertion losses and does not modify the bulkiness of the integrated optical circuit.

The polarizing optical device of the invention has a very high polarization rejection ratio.

In a particular and advantageous embodiment, the polarizing optical device further comprises a section of a third optical waveguide and a third polarizer, the third polarizer being a thin-plate polarizer having a physical thickness U and a refractive index n, the third thin-plate polarizer being interposed on the optical path between, on the one hand, another waveguide end of the first polarizer, and on the other hand, an end of the third optical waveguide, the physical distance g between said other waveguide end of the first polarizer and said end of the third optical waveguide being lower than or equal to twice the Rayleigh length, i.e $$g \leq 2 \times \frac{\pi w_0^2}{\lambda_m},$$

where $$\lambda_m = \frac{\lambda_0}{n}$$

represents the wavelength of a beam in the third polarizer and $2w_0$ represents the diameter of a single-mode beam at 1/e in amplitude in the waveguide of the first polarizer and the physical thickness U of the third polarizer being lower than or equal to the physical distance g.

According to various particular and advantageous aspects of embodiments of the invention:

the physical distance d between said waveguide end of the first polarizer and said end of the second optical waveguide is lower than or equal to $$\frac{\pi w_0^2}{\lambda_m};$$

the physical distance g between said other waveguide end of the first polarizer and said end of the third optical waveguide is lower than or equal to $$\frac{\pi w_0^2}{\lambda_m};$$

the physical distance d between said waveguide end of the first polarizer and said end of the second optical waveguide is lower than or equal to $$\frac{\pi w_0^2}{2 \times \lambda_m};$$

the physical distance g between said other waveguide end of the first polarizer and said end of the third optical waveguide is lower than or equal to $$\frac{\pi w_0^2}{2 \times \lambda_m};$$

the second thin-plate polarizer has a physical thickness T lower than or equal to 50 microns and preferably lower than or equal to 30 microns;

the third thin-plate polarizer has a physical thickness U lower than or equal to 50 microns and preferably lower than or equal to 30 microns;

the second polarizer is formed of a thin plate of polarizing glass;

the third polarizer is formed of a thin plate of polarizing glass;

the first waveguide polarizer on an integrated optical circuit is formed by proton exchange on a lithium niobate substrate.

In a particular and advantageous embodiment, the integrated optical circuit comprises the first waveguide polarizer, a Y-junction separator and/or an optical phase modulator.

In an alternative embodiment, the first waveguide polarizer is a fiber optic polarizer.

Advantageously, the polarization rejection ratio of the at least one thin-plate polarizer is better than −20 dB and, preferably, the polarization rejection ratio of the waveguide polarizer is better than −40 dB.

According to particular and advantageous aspects:

the first polarizer and the second polarizer are linear polarizers having polarization axes aligned relative to each other;

the first polarizer and the third polarizer are linear polarizers having polarization axes aligned relative to each other;

the axial alignment defect between the waveguide end of the first polarizer and the end of the second waveguide is lower than $w_0/2$ and preferably lower than $w_0/10$;

said section of a second optical waveguide is a section of polarizing fiber;

said section of a third optical waveguide is a section of polarizing fiber;

the second polarizer is bonded to the end of the waveguide of the first polarizer and to the end of the second optical waveguide; and/or the third polarizer is bonded to the end of the waveguide of the first polarizer and to the end of the third optical waveguide.

The present invention also relates to the characteristics that will be revealed in the following description and that will have to be considered in isolation or according to any technically possible combination thereof.

DETAILED DESCRIPTION OF AN EXAMPLARY EMBODIMENT

Figure 3:
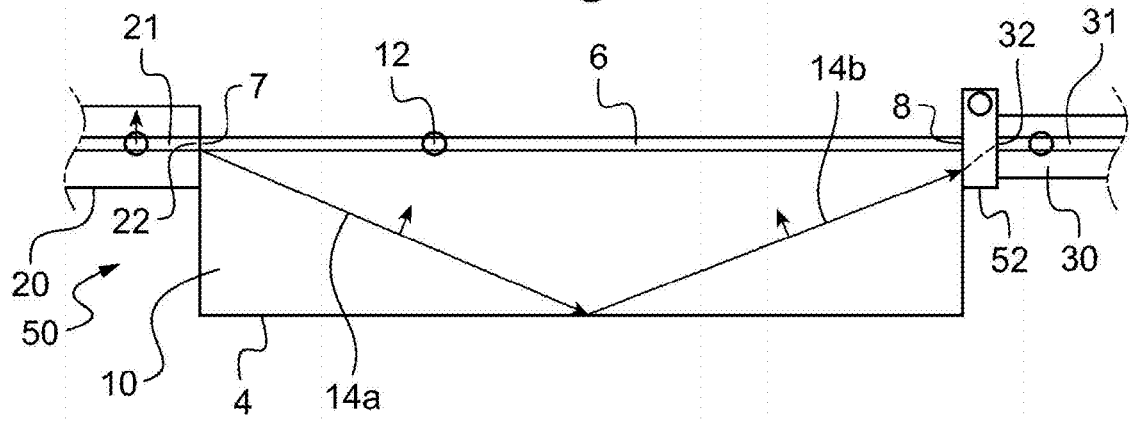
Figure 4:
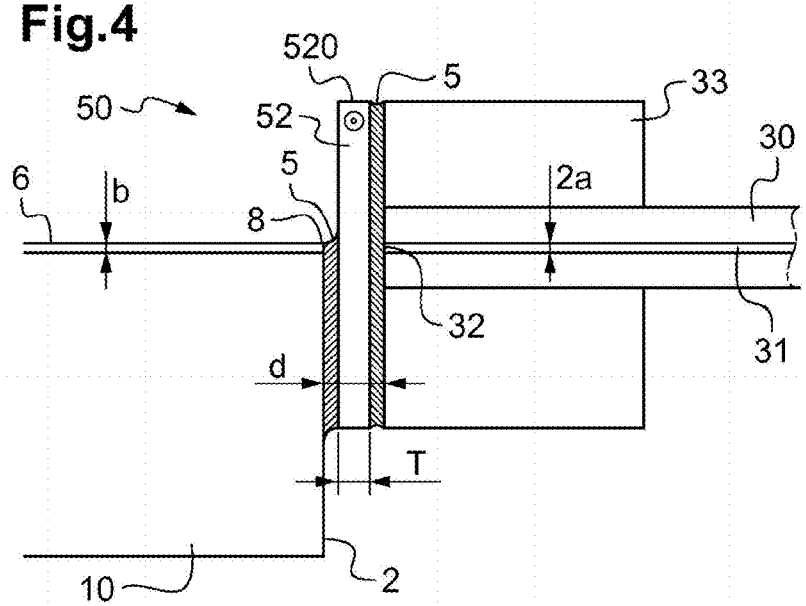
Figure 5:
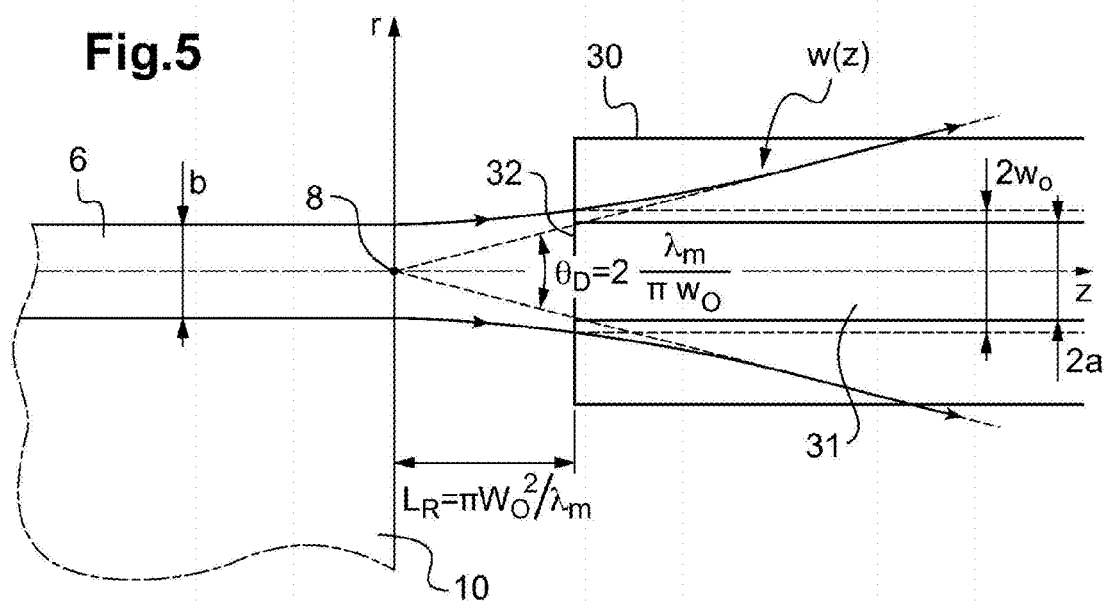
Figure 6:
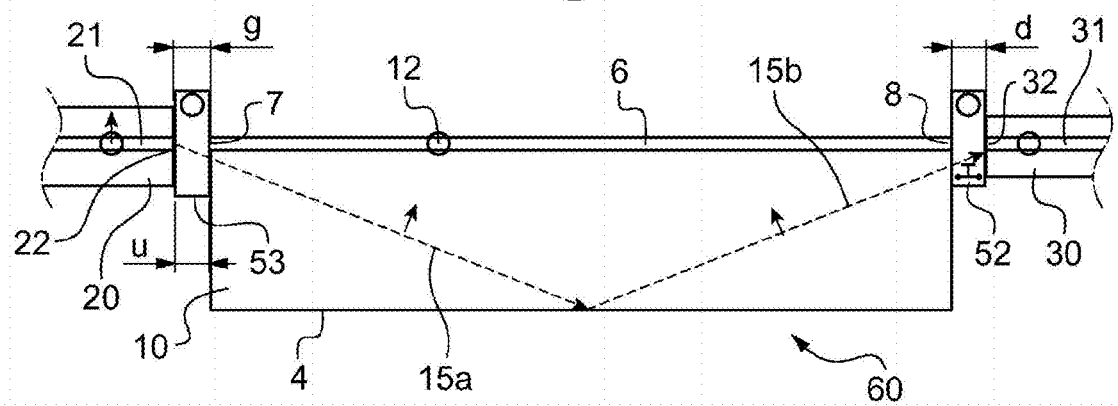

This description, given by way of non-limitative example, will allow to better understand how the invention may be implemented, with reference to the appended drawings, in which:

FIG. 1 schematically shows a perspective view of a waveguide polarizing device on an integrated optical circuit according to the prior art;

FIG. 2 schematically shows a sectional view of an optical fiber end connected to a waveguide polarizer according to the prior art;

FIG. 3 schematically shows a sectional view of a polarizing optical device according to a first embodiment of the invention;

FIG. 4 schematically shows a sectional view of a detail of a polarizing optical device according to an embodiment of the invention;

FIG. 5 illustrates the divergence of a Gaussian beam at the output of a single-mode optical fiber;

FIG. 6 schematically shows a sectional view of a polarizing optical device according to a second embodiment of the invention.

DEVICES

FIG. 3 proposes a polarizing optical device 50 comprising a first optical waveguide 20, a first waveguide polarizer 6, a second polarizer 52 and a second optical waveguide 30. The polarizing device 50 hence comprises a mounting of at least two polarizers in series in a particular configuration that allows attenuating the propagation of non-guided spurious beams without inducing noticeable losses.

A first waveguide polarizer 6 is chosen. Preferably, the first polarizer 6 is a waveguide polarizer integrated on the substrate 10 of an integrated optical circuit. Preferably, the first polarizer 6 is formed by proton exchange on a lithium niobate substrate. In another variant, the first polarizer 6 is a polarizing fiber.

An aspect of the invention consists in selecting a second polarizer 52 operating in transmission and having an ultra-thin thickness. Preferably, the ultra-thin polarizer 52 has a thickness T lower than or equal to 50 microns. Another aspect of the invention consists in placing the second ultra-thin polarizer 52 between the end 8 of the first waveguide polarizer 6 and the end 32 of another waveguide. In FIG. 3, the other waveguide is consisted of the core 31 of an optical fiber 30.

The optical fiber 30 has a core diameter equal to 2a. The waveguide polarizer 6 has a cross-dimension b. Preferably, the cross-dimensions of the optical fiber 30 and of the waveguide polarizer 6 are identical. The longitudinal axes of the optical fiber 30 and of the waveguide polarizer 6 are aligned relative to each other, so as to avoid the optical losses. In an exemplary embodiment, the waveguide 6 is manufactured by proton exchange on a lithium niobate substrate, and the waveguide has, by construction, an elliptic section, with a ratio between the two axes of the ellipse practically equal to two.

The TE polarization axis of the ultra-thin plate polarizer 52 is aligned with the TE polarization axis of the polarizing waveguide 6 before bonding.

Particularly advantageously, the ultra-thin plate polarizer 52 has a parallelepipedal external shape, of 1 mm wide by 2 mm long, with an external facet 520 parallel to a polarization axis of the ultra-thin polarizer 52. Now, the lithium niobate integrated circuit has a lower surface 4 and an upper surface 3 that are planar and parallel to the axis of the waveguide polarizer 6. To align the axis of the ultra-thin plate polarizer 52 to the polarization axis of the waveguide polarizer 6, it is then sufficient to align mechanically the facet 520 of the ultra-thin polarizer 52 to the planar face 3 or 4 of the integrated optical circuit. This mechanical alignment allows limiting to a few tenths of degrees the alignment defect between the axes of the ultra-thin polarizer 52 and of the waveguide polarizer 6. A finer alignment in orientation may then be performed.

The polarizing device 50 of FIG. 4 operates as follows. A non-polarized beam propagates in the core 21 of the optical fiber 20 up to an end 22. The beam is coupled in the integrated optical circuit. A part 12 of the beam, TE polarized, is coupled via the end 7 of the waveguide 6 and propagates in a guided manner up to the other end 8 of the waveguide 6. Another part of the incident beam, TM polarized, propagates in a non-guided manner, in the substrate 10. For example, a part of the non-guided beam 14a is reflected on the lower face 4 of the substrate and forms a reflected beam 14b, also TM polarized. On the one hand, the ultra-thin polarizer 52 receives the beam TE polarized 12 and transmits this beam 12 with a very low attenuation (about 0.5 dB) to the end 32 of the optical fiber 30. On the other hand, the ultra-thin polarizer 52 receives the beam TM polarized 14b propagating in the IOC; the ultra-thin polarizer 52 attenuates by about −20 dB to −30 dB this beam TM polarized 14b. The core 31 of the optical fiber 30 hence essentially collects the beam TE polarized 12.

The polarizing device 40 allows polarizing an incident beam 12 with a polarization extinction ratio far higher than that of the single integrated waveguide polarizer 6. The transmitted beam undergoes a very low attenuation during the transmission through the ultra-thin polarizer 52, although the ultra-thin polarizer is not guiding. The low thickness of the ultra-thin polarizer 52 allows avoiding the losses by divergence of the TE polarized beam.

In FIG. 4, it is respectively noted:
b the cross-dimension of the polarizing waveguide 6,
2a the diameter of the core 31 of the optical fiber 30,
T the thickness of the second polarizer 52, and
d the distance between the end 8 of the first waveguide polarizer 6 and the end 32 of the other waveguide 12.

The dimensions 2a and b are chosen so that the optical coupling between the two waveguides is possible, preferably in the two directions of propagation. The mode diameters of the different guides must hence be compatible, which may be made with a great tolerance.

More precisely, the end 32 of the optical fiber 30 is arranged at a physical distance d from the end 8 of the first waveguide polarizer 6, the physical distance d being lower than or equal to twice the length of the Rayleigh zone defined by the following relation:

$$d \leq 2 \times \frac{\pi w_0^2}{\lambda_m},$$

where $w_0$ represents the radius of a single-mode beam in the optical guiding means and $\lambda_m$ represents the wavelength of the source beam 100 in the material of the polarizer $$\left(\lambda_m = \frac{\lambda_0}{n}\right),$$

where n represents the refractive index of the material of the polarizer and $\lambda_0$ represents the wavelength of the source beam 100 in vacuum.

The second polarizer 52 is a thin-plate Dolarizer, or ultra-thin polarizer, whose thickness satisfies the condition:

$$T \leq d \leq 2 \times \frac{\pi w_0^2}{\lambda_m}.$$

Advantageously, the ultra-thin polarizer 52 is made of an inorganic material. An inorganic polarizer offers an increased resistance to the intense optical beams and provides the polarizing device with a longer lifetime.

Such an ultra-thin polarizer 52 is for example manufactured by the Corning company under the brand name "Polarcor UltraThin Glass Polarizers". Such an ultra-thin polarizer 52 is consisted of a polarizing glass plate having a thickness of about 30 microns±10 microns. The dimensions of an ultra-thin polarizer may be defined as a function of the needs of the application, except the thickness. For example, an ultra-thin polarizer having a width of 1 mm and a length of 2 mm is used. An ultra-thin plate polarizer 52 has generally a polarization rejection ratio of −20 dB able to go up to −23 dB according to the manufacturer specification. The spectral band of transmission of the ultra-thin plate polarizer 52 is located in the near infrared (about 1310 nm and 1550 nm).

A thin-plate polarizer has the advantage to have a bandwidth of several tens of nanometers (for example 1275-1345 nm or 1510-1590 nm). The bandwidth of the thin-plate polarizer is hence more extended than the spectral band of the source. The thin-plate polarizer does not reduce the bandwidth of the polarizing device. It is observed that the bandwidth of the thin-plate polarizer is more extended than that of a polarizing optical fiber. Indeed, the bandwidth of a polarizing fiber is generally of 40 to 60 nm. Moreover, the bandwidth of an optical fiber may further be reduced due to the curvatures of the fiber. On the other hand, these fibers eliminate the fast polarization and not the slow polarization. Now, a proton-exchange lithium-niobate integrated optical circuit let the fast polarization pass through. Spurious signals of the polarizing fiber may then interfere with the useful signal of the integrated optical circuit.

In a variant, the other waveguide 31 is a waveguide integrated on an integrated optical circuit.

In the embodiment illustrated in FIG. 4, the ultra-thin polarizer 52 is directly bonded to the output of a waveguide polarizer 6, i.e. to the face 2 of the substrate 10. On the other hand, the ultra-thin plate polarizer 52 is bonded to the ferrule 32 of a single-mode optical fiber 30. Advantageously, the glue 5 used to bond the ultra-thin plate polarizer 52 is transparent at the wavelength of the source. Preferably, the glue 5 has a refractive index adapted to the fiber and/or to the integrated optical circuit. Advantageously, the glue has a negligible thickness (of less than 1 micron to at most a few microns). In this respect, FIG. 3 is not a representation on scale, the thickness of the glue being very lower than the thickness T of the ultra-thin polarizer 52.

The arrangement of FIGS. 3-4 allows arranging in series a first waveguide polarizer 6, a second ultra-thin polarizer 52 and the end of the optical fiber 30. Advantageously, the second ultra-thin polarizer 52 operates by absorption, so that the TM polarization is strongly attenuated at the input of the optical fiber 30. The second ultra-thin polarizer 52 induces an optical insertion loss of about −0.5 dB on the beam of TE polarization, so that the polarization state transmitted is not much affected by the insertion losses linked to the second polarizer 52.

The extinction ratio of the two polarizers 6, 52 in series is improved by about −25 dB to −35 dB. Advantageously, the waveguide polarizer 6 on IOC has a rejection ratio of −45 dB to −65 dB, which allows obtaining a polarizing device 50 having a total polarization rejection ratio of about −70 dB to −100 dB.

It can be noticed that the mounting of FIG. 3 operates in the two directions of propagation of the guided optical beams. The polarization means 50 of FIG. 3 are hence perfectly reciprocal.

Advantageously, the second polarizer 52 extends over the face of the substrate 2 of the integrated optical circuit that is transverse to the polarizing waveguide 6. That way, the second polarizer 52 allows attenuating the transmission of spurious beams between the optical fiber 30 and the substrate 10 of the integrated optical circuit, and that in the two directions of propagation.

The polarizing device 50 is formed of at least one first waveguide polarizer 6, a second thin-plate polarizer 52 and another waveguide 31. Such a polarizing device 50 is easily inserted on the optical path between a source and a detector, for example.

Thanks to the polarizing device 50, an optical beam coming from a light source is linearly polarized in series, for example in transmission, via the first polarizer 6, then the second polarizer 52. This polarizing device 50 allows increasing the polarization rejection ratio without increasing the bulkiness of the integrated optical circuit and without inducing additional losses on the transmitted beam.

On the contrary, it is observed that these results do not apply to a more common, polarizing thin film polarizer on a glass substrate, as for example a glass polarizer Polarcor™ of the Corning company formed of two polarizing thin films of 30 to 50 micrometers of thickness, deposited on the two opposite faces of a glass plate of 0.5 to 0.15 mm thick. Such a thin film polarizer has yet a very high polarization rejection ratio of at least −40 dB, which makes it a priori more interesting in the searched application. Indeed, it is searched to maximize the polarization rejection ratio of a polarizing device, to ideally target a polarization rejection ratio of −90 dB to −100 dB. However, such a polarizing thin film polarizer on a glass substrate leads to too high losses in the transmitted beam, of about 5 dB, at each passage through a polarizing thin film polarizer.

Within the framework of the present invention, the result obtained with an ultra-thin plate polarizer 52 arranged in series with the waveguide polarizer 6 is analysed as follows, in relation with FIG. 5.

Let's consider a single-mode Gaussian beam propagating in the waveguide 6 on an integrated optical circuit. The cross-dimension of the waveguide is noted b. The diameter of the single-mode Gaussian beam propagating in the waveguide 6 is noted: $2w_0$.

At the end 8 of the waveguide 6, the propagation of the Gaussian beam in free space is performed along the longitudinal direction Z following two distinct regimes. In a so-called near-field, first part between the end of the waveguide 6 and a distance called the Rayleigh length, the beam propagates with an almost null divergence. The Rayleigh length $L_R$ is defined as follows:

Let's N be such that $2w_o = N\lambda_m$ $$L_R = \frac{\pi w_0^2}{\lambda_m}$$

Hence the approximation:

$$L_R \approx \frac{(2w_0)^2}{\lambda_m} = N^2 \lambda_m$$

In a so-called far-field, second part, beyond the Rayleigh length, the beam propagates with a divergence having an angular aperture equal to θ, defined as follows:

$$\theta = 2\frac{\lambda}{\pi w_0}$$

Hence the approximation:

$$\theta \approx \frac{\lambda}{2w_0} \approx \frac{1}{N}$$

where N represents the number of wavelengths contained in $2w_0$ of the optical fiber 20.

For a cross-dimension b of the waveguide equal to 6 microns, a wavelength in vacuum equal to $\lambda_0=1.55$ μm, the diameter of the single-mode beam is $2w_0$ equal to about 8 μm, and the Rayleigh length is equal to about 48 microns in a medium of index n=1.5. In a zone, called the Rayleigh zone, extending over a length $L_R$ from the end 8 of the waveguide 6 and of diameter $2w_0$, the beam divergence is almost null, the beam diameter thus remains equal to $2w_0=8$ microns.

At a distance along the axis Z of 50 microns, the beam diverges and has a diameter 2w (z=50 μm) of about 11.8 microns, and at a longitudinal distance Z of 150 microns, the beam diameter 2w (z=150 μm) is of about 26 microns. At a distance of 65 μm, equal to twice the Rayleigh length, the beam diameter 2w (z=65 μm) is of about 13.4 microns. In practice, if the two waveguides 6 and 21 have the same size, the loss is of −3 dB at a distance of twice the Rayleigh length.

In an exemplary embodiment, the optical fiber has a mode diameter $2w_0$ between about 6 and 8 μm. The polarizing waveguide 6 has a rather elliptic (and not circular) mode, having a great axis of about 8 microns of diameter and a small axis or about 4 microns of diameter.

It is chosen an ultra-thin plate polarizer 52 of physical thickness T lower than the Rayleigh length arranged between the end of the optical fiber and the end of the waveguide polarizer 6. Hence, the Gaussian single-mode beam exiting from the optical fiber remains very little divergent between the end of the integrated waveguide polarizer 6 and the input of the optical fiber 30.

This arrangement allows significantly reducing the spurious couplings out of the polarizing waveguide and reducing the propagation of the spurious beams in the substrate of the integrated waveguide polarizer. Moreover, the losses induced in the polarized and guided beam are reduced, in practice to less than 1 dB. In the direction of propagation, the core 31 of the fiber collects almost no light beam propagating in the substrate of the waveguide polarizer 6. This polarizing device also operates reciprocally in the reverse direction of propagation of the beams.

This combination allows adding efficiently the polarization rejection ratio of the first polarizer 6 and of the second polarizer 52, without generating spurious interference beam.

The longitudinal axis at the end of the waveguide section 31 is preferably aligned to the longitudinal axis of the waveguide polarizer 6. Advantageously, the defect of transverse alignment between the first waveguide end 8 of the first polarizer 6 and the second waveguide end 32 of said optical waveguide section 31 is lower than $w_0/2$, and preferably lower than $w_0/10$.

The axial alignment of the thin-plate polarizer is not critical, when it is arranged on the source side.

The ultra-thin plate polarizer 52 being preferably consisted of glass further has the advantage to be more resistant to a laser beam than an organic polarizer.

On the contrary, with a thin film polarizer, which thickness is comprised between 0.15 and 0.5 mm, i.e. between 150 microns and 500 microns, the first waveguide polarizer 6 cannot be arranged in the Rayleigh zone of the optical fiber. In this case, the beam polarized by the thin film polarizer diverges: a part of this beam is transmitted in the waveguide polarizer and another part of this beam, of non-negligible power, may be transmitted via the substrate of the waveguide polarizer, which induces non-negligible losses, and possibly the appearance of a channelled spectrum. The use of a thin film polarizer of thickness higher than the Rayleigh length hence produces too important losses.

A thin-plate polarizer, i.e. of thickness lower than the Rayleigh length, has a polarization rejection ratio limited in practice to about −20 dB to −35 dB, i.e. lower by several orders of magnitude than the polarization rejection ratio, about −40 dB, of a thin film polarizer, having a thickness of 150 to 500 μm. Nevertheless, the juxtaposition of a thin-plate polarizer and a waveguide polarizer formed by proton exchange on a lithium niobate substrate allows reaching a measured polarization rejection ratio of 80 to 110 dB with very little losses.

The positioning tolerance of the thin-plate polarizer is hence far lower in the longitudinal direction along the axis Z than in a cross direction. In cross direction, the dimensions of the thin-plate polarizer are far greater than the mode size.

The polarizing device of the invention paradoxally selects a second polarizer that has an admittedly moderated polarization rejection ratio, but that has a thickness lower than the Rayleigh length, to allow arranging in series the first polarizer and the second polarizer in this Rayleigh zone at the output of the optical fiber 20.

In a variant, the optical fiber 30 may be replaced by a first waveguide on an integrated optical circuit, having cross-dimensions similar to those of the second waveguide polarizer. In this case, the second ultra-thin polarizer 52 is arranged between the first waveguide polarizer and the first waveguide on an integrated optical circuit, so that the first and second polarizers are in the Rayleigh zone of the first waveguide on an integrated optical circuit.

In a particular embodiment, the optical fiber 30 is a polarizing or polarization-maintaining fiber. In another variant, the optical fiber 30 is replaced by a polarizing waveguide.

The first polarizer 6 is a waveguide polarizer on an integrated optical circuit, preferably formed on a lithium niobate substrate.

Advantageously, the first waveguide polarizer 6 is integrated on the common branch of a Y-junction separator and the ultra-thin plate polarizer 52 is placed at the common input-output of the integrated optical circuit. The second polarizer 52 is bonded to the end of an optical fiber 12 that connects the output end of the interferometer to the source separator 6. The second thin-plate polarizer 52 is arranged between the end 32 of the optical fiber 30 and the end 8 of the first waveguide polarizer 6.

In a first embodiment, the thin-plate polarizer 52 is aligned on the waveguide polarizer 6. In this case, the alignment of the polarization axes is not much critical, because it is estimated that an alignment defect of 5 degrees is liable to induce a limited loss of 1% in the detected signal.

For a thin-plate polarizer having 20 dB of rejection ratio, the extinction ratio of the polarimetric device is maximum when the two axes of the polarizers are aligned relative to each other.

As an alternative and/or as a complement, another ultra-thin plate polarizer may be arranged on the optical path in the Rayleigh zone at the input of the integrated optical circuit 6, the thickness of this other ultra-thin polarizer being also lower than the Rayleigh length.

Hence, a beam is polarized successively by a thin-plate polarizer 53, the waveguide polarizer 6, then by another thin-plate polarizer 52.

Advantageously, in a second embodiment illustrated in FIG. 6, the polarizing optical device includes a first integrated waveguide polarizer 6, a thin-plate polarizer 53 and a thin-plate polarizer 52 placed respectively at each waveguide end 7, respectively 8 of the integrated optical circuit. A thin-plate polarizer 53 is bonded to the end of a section of optical fiber 20. Another thin-plate polarizer 52 is bonded to the end of a section of optical fiber 30.

Let's suppose that a non-polarized optical beam propagates in the core 21 of the optical fiber 20. The thin-plate polarizer 53 transmits a TE polarization component towards the end 7 of the waveguide 6. The attenuation induced by the thin-plate polarizer 53 in the transmitted beam 12 is only of about 0.5 dB. On the other hand, the thin-plate polarizer 53 attenuates the TM polarization component by about −25 dB to −35 dB. A residual TM component 15a is liable to propagate in a non-guided manner in the substrate. At the other end 8 of the waveguide 6 is placed another thin-plate polarizer 52.

The polarizing waveguide 6 transmits a beam TE polarized to the thin-plate polarizer 52. However, the thin-plate polarizer 52 also receives a residual component 15b of TM polarization, which has propagated by internal reflection on the lower face 4 of the substrate.

The thin-plate polarizer 52 itself attenuates the residual component 15b of TM polarization by about −25 dB to −35 dB. In the same time, the thin-plate polarizer 52 induces a very low attenuation, of about 0.5 dB, in the TE polarized beam 12.

Hence the core 31 of the optical fiber 30 collects a beam of TE polarization, with an excellent polarization rejection ratio and low losses in the transmitted signal.

Indeed, the device 60 of FIG. 6 allows summing the extinction ratios of the thin-plate polarizer 53, the waveguide polarizer 6 and the thin-plate polarizer 52. This configuration allows obtaining a very compact polarizing device and having a polarization extinction ratio approaching the −100 dB. Moreover, the polarizing device 60 has a perfectly reciprocal operation.

In the case where the IOC includes several waveguides 6 arranged adjacent to each other, the output paths of the IOC are separated by less than a distance lower than the cross-dimension of a thin-plate polarizer, it is possible to use a single and same ultra-thin plate polarizer at the output of the IOC to cover the ends of several waveguides on a same integrated optical circuit. In an exemplary embodiment, the cross-dimension of a thin-plate polarizer is of 2 mm, which allows covering waveguide ends distant by less than 2 mm. It is to be noted that there exist thin-plate polarizers of dimension far higher than 2 mm.

In a preferred embodiment, the optical fiber 20 and/or 30 is a standard single-mode optical fiber. In another embodiment, the optical fiber 20 and/or 30 is a polarization-maintaining optical fiber, which axes are preferably aligned to the axes of the waveguide polarizer 6 and/or of the at least one thin-plate polarizer 52, 53, respectively.

The invention claimed is:

1. A waveguide polarizing optical device characterized in that the waveguide polarizing optical device comprises:
   a first polarizer, the first polarizer being a waveguide polarizer on an integrated optical circuit, and
   a section of a second optical waveguide,
   a second polarizer, the second polarizer being a thin-plate polarizer having a physical thickness T and a refraction index n, and
   the second thin-plate polarizer being interposed on the optical path between, on the one hand, a waveguide end of the first polarizer, and on the other hand, an end of the second optical waveguide, the physical distance d between said waveguide end of the first polarizer and said end of the second optical waveguide being lower than or equal to twice the Rayleigh length, i.e.

$$d \leq 2x\frac{\pi w_0^2}{\lambda_m}, \text{ where } \lambda_m = \frac{\lambda_0}{n}$$

represents the wavelength of a beam in the second polarizer and $2w_0$ represents the diameter of a single-mode beam at 1/e in amplitude in the waveguide of the first polarizer, and
the physical thickness T of the second polarizer being lower than or equal to the physical distance d.

2. The waveguide polarizing optical device according to claim 1, further comprising:
   a section of a third optical waveguide, and
   a third polarizer, the third polarizer being a thin-plate polarizer having a physical thickness U and a refractive index n,
   the third thin-plate polarizer being interposed on the optical path between, on the one hand, another waveguide end of the first polarizer, and on the other hand, an end of the third optical waveguide,
   the physical distance g between said other waveguide end of the first polarizer and said end of the third optical waveguide being lower than or equal to twice the Rayleigh length, i.e.

$$g \leq 2x\frac{\pi w_0^2}{\lambda_m}, \text{ where } \lambda_m = \frac{\lambda_0}{n}$$

represents the wavelength of a beam in the third polarizer and $2w_0$ represents the diameter of a single-mode beam at 1/e in amplitude in the waveguide of the first polarizer, and
the physical thickness U of the third polarizer being lower than or equal to the physical distance g.

3. The waveguide polarizing optical device according to claim 1, wherein the physical distance d between said waveguide end of the first polarizer and said end of the second optical waveguide is lower than or equal to $$\frac{\pi w_0^2}{\lambda_m}.$$

4. The waveguide polarizing optical device according to claim 1, wherein the physical distance d between said waveguide end of a first polarizer and said end of the second optical waveguide is lower than or equal to $$\frac{\pi w_0^2}{2 \times \lambda_m}.$$

5. The waveguide polarizing optical device according to claim 1, wherein the second thin-plate polarizer has a physical thickness T lower than or equal to 50 microns and preferably lower than or equal to 30 microns.

6. The waveguide polarizing optical device according to claim 1, wherein the second thin-plate polarizer is formed of a polarizing glass thin plate.

7. The waveguide polarizing optical device according to claim 1, wherein the first waveguide polarizer on an integrated optical circuit is formed by proton exchange on a lithium niobate substrate.

8. The waveguide polarizing optical device according to claim 1, wherein the first polarizer and the second polarizer are linear polarizers having axes of polarization aligned relative to each other.

9. The waveguide polarizing optical device according to claim 1, wherein said section of a second optical waveguide is a section of polarizing fiber.

10. The waveguide polarizing optical device according to claim 1, wherein the second polarizer is bonded to the waveguide end of the first polarizer and to the end of the second optical waveguide.

11. The waveguide polarizing optical device according to claim 2, wherein the third polarizer is bonded to the waveguide end of the first polarizer and bonded to the end of the third optical waveguide.

12. The waveguide polarizing optical device according to claim 2, wherein the physical distance g between said other waveguide end of the first polarizer and said end of the third optical waveguide is lower than or equal to $$\frac{\pi w_0^2}{\lambda_m}.$$

13. The waveguide polarizing optical device according to claim 2, wherein the physical distance g between said other waveguide end of the first polarizer and said end of the third optical waveguide is lower than or equal to $$\frac{\pi w_0^2}{2 \times \lambda_m}.$$

14. The waveguide polarizing optical device according to claim 2, wherein the third thin-plate polarizer has a physical thickness U lower than or equal to 50 microns and preferably lower than or equal to 30 microns.

15. The waveguide polarizing optical device according to claim 2, wherein the third thin-plate polarizer is formed of a polarizing glass thin plate.

16. The waveguide polarizing optical device according to claim 2, wherein the first waveguide polarizer on an integrated optical circuit is formed by proton exchange on a lithium niobate substrate.

17. The waveguide polarizing optical device according to claim 2, wherein the first polarizer and the third polarizer are linear polarizers having axes of polarization aligned relative to each other.

18. The waveguide polarizing optical device according to claim 2, wherein said section of a third optical waveguide is a section of polarizing fiber.

19. The waveguide polarizing optical device according to claim 2, wherein the second polarizer is bonded to the waveguide end of the first polarizer and to the end of the second optical waveguide.

20. The waveguide polarizing optical device according to claim 2, wherein the third polarizer is bonded to the waveguide end of the first polarizer and bonded to the end of the third optical wave guide.

* * * * *